United States Patent
Maehara

(10) Patent No.: US 7,295,357 B2
(45) Date of Patent: Nov. 13, 2007

(54) APPARATUS FOR HANDLING MINUTE OBJECT

(75) Inventor: Hiroshi Maehara, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/537,413

(22) PCT Filed: Apr. 19, 2004

(86) PCT No.: PCT/JP2004/005550

§ 371 (c)(1),
(2), (4) Date: Jun. 2, 2005

(87) PCT Pub. No.: WO2004/097844

PCT Pub. Date: Nov. 11, 2004

(65) Prior Publication Data

US 2006/0092517 A1 May 4, 2006

(30) Foreign Application Priority Data

Apr. 25, 2003 (JP) ............................ 2003-122463

(51) Int. Cl.
*G02B 5/32* (2006.01)

(52) U.S. Cl. ..................... 359/15; 359/566; 359/614; 359/615

(58) Field of Classification Search ................ 359/614, 359/15, 566

See application file for complete search history.

(56) References Cited

U.S. PATENT DOCUMENTS 5,939,716 A * 8/1999 Neal .......................... 250/251

(Continued)

FOREIGN PATENT DOCUMENTS

JP 2000-241310 9/2000

(Continued)

OTHER PUBLICATIONS

Liesener J et al: "Multi-functional optical tweezers using computer-generated holograms" Optics Communications, North-Holland Publishing Co. Amsterdam, NL vol. 185, No. 1-3, Nov. 1, 2000, pp. 77-82, XP004219458 ISSN: 0030-4018.

(Continued)

*Primary Examiner*—Fayez G. Assaf
(74) *Attorney, Agent, or Firm*—Fitzpatrick, Cella, Harper & Scinto

(57) ABSTRACT

An apparatus for handling a minute object such as a cell by using a holographic optical tweezers that comprises a laser light source 1, holographic plate 3 having a specified pattern to form a hologram with light emitted from the light source, and a transparent plate that holds a liquid including a minute object, wherein the holographic plate 3 is irradiated with laser light emitted from the laser light source 1, and the laser light passed through the holographic plate 3 is focused in a sample solution 7 held on the transparent plate 6 to form a hologram having a pattern according to the pattern of the holographic plate 3 in the sample solution 7.

4 Claims, 3 Drawing Sheets

U.S. PATENT DOCUMENTS

| | | | |
|---|---|---|---|
| 6,416,190 B1 | 7/2002 | Grier et al. | 359/614 |
| 6,501,071 B1 | 12/2002 | Hatase | |
| 2003/0047676 A1 | 3/2003 | Grier et al. | 250/251 |
| 2006/0060767 A1* | 3/2006 | Wang et al. | 250/251 |

FOREIGN PATENT DOCUMENTS

| | | |
|---|---|---|
| JP | 2002-219700 | 8/2002 |

OTHER PUBLICATIONS

Dufresne Eric R et al: "Computer-generated holographic optical tweezer arrays" Review of Scientific Instruments, American Institute of Physics, US, vol. 72, No. 3, Mar. 2001, pp. 1810-1816, XP012039046 ISSN:0034-6748.

Korda Pamela et al: "Nanofabrication with holographic optical tweezers" Review of Scientific Instruments, American Institute of Physics, US, vol. 73, No. 4, Apr. 2002, pp. 1956-1957, XP012039995 ISSN: 0034-6748.

Curtis J E et al: "Dynamic holographic optical tweezers" Optics Communications, North-Holland Publishing Co. Amsterdam, NL, vol. 207, No. 1-6, Jun. 15, 2002, pp. 169-175, XP004362024 ISSN: 0030-4018.

* cited by examiner

FIG. 3A
FIG. 3B
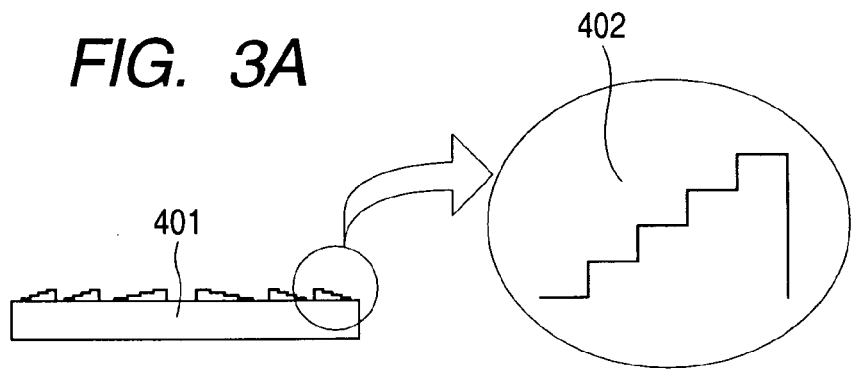
FIG. 4A
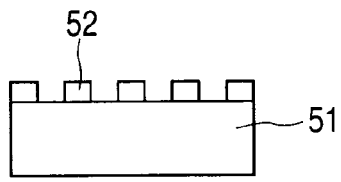
FIG. 4B
FIG. 4C
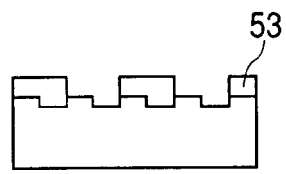
FIG. 4D
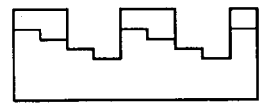
FIG. 4E
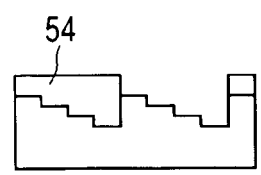
FIG. 4F
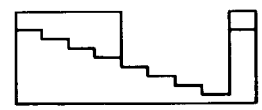
FIG. 4G

APPARATUS FOR HANDLING MINUTE OBJECT

TECHNICAL FIELD

The present invention relates to an apparatus and a method for handling a minute object in technological fields including biotechnology, utilizing a micro optical device, a micromachine, or a fusion thereof.

BACKGROUND ART

With the development of biotechnology, there is an increasing demand for methods and apparatuses for handling a minute object such as a cell sample easily and efficiently.

Up to now, a cell sample is carefully manipulated under a microscope using a manipulation apparatus suitable for operation in a very narrow space between the sample and an object lens. Such manipulation apparatuses are often prepared by users according to the usage. Such manipulation apparatuses are, for example, capillaries and pipettes of specific shapes.

Recently, optical tweezers has become to be used for capturing or moving a very delicate cell sample without damaging cells.

As one of the techniques using such optical tweezers, Japanese Unexamined Patent Publication No. 2000-241310 discloses a technique for capturing a plurality of microorganisms at the same time by using a single optical trapping means in a time-division manner.

Also, Japanese Unexamined Patent Publication No. 2002-219700 discloses a technique to capture and move a minute object by using a surface emitting laser that emits plural laser beams as a light source and by modulating the emission intensity of each light-emitting device spatially and temporally.

As described above, the conventional manipulation method of a minute object such as a cell uses a micromanipulator under a microscope. This manipulation is difficult requiring skill and takes a very long time to achieve desired manipulation. Therefore, it is hard with the conventional method to detect, capture and transfer to a desired position for treatment a minute object such as a cell floating in a liquid for treatment, with ease and speed.

Also, with the method using optical tweezers, generally using single optical tweezers to find and capture a cell sample, it is extremely difficult and takes time to perform such manipulation under a microscope. Even with the methods described in Japanese Unexamined Patent Publication No. 2000-241310 and No. 2002-219700, manipulation is difficult and requires skill.

As described above, effective manipulation of a minute object with the conventional techniques is difficult. Therefore, one of the major obstacles in industrialization in a technical field requiring manipulation of a minute object is low productivity due to the minute object manipulation.

One may consider to improve operability of the method using optical tweezers by arranging the shape of the optical tweezers, or by forming plural optical tweezers at the same time. However, it will require a complicated optical system and a plurality of light sources, raising new problems such as the large size and complication of the apparatus.

DISCLOSURE OF THE INVENTION

In order to solve the problems described above, the present invention is to provide a simple apparatus for handling a minute object capable of easy and speedy manipulation for capturing and moving a minute object by using an optical tweezers.

The present invention provides an apparatus for handling a minute object by using an optical tweezers that comprises a light source; a first base that forms a hologram with light emitted from the light source; and a second base that holds a liquid including the minute object, wherein the hologram formed in the liquid on the second base is used as an optical tweezers.

The present invention also provides a method for handling a minute object by using an optical tweezers. The method comprises the steps of: forming a hologram with light emitted from a light source; forming an optical tweezers of the hologram formed in a liquid including a minute object; and handling the minute object by using the optical tweezers.

According to the present invention, an optical tweezers of a desired pattern is formed by holography, whereby the handling performance such as relocation of a minute object can be improved. Such handling is difficult with conventional optical tweezers of a single circular pattern. Thus, it is possible to easily and speedily relocate a minute object to a desired position. As a result, many minute objects can be efficiently treated.

The apparatus of the present invention for handling a minute object can be constructed by using a holographic plate for producing a hologram without using a plurality of light sources or a complicated optical system, to attain a simple structure.

According to the present invention, it is possible to provide a simple apparatus that can manipulate a minute object easily and speedily to capture and move the object by using an optical tweezer.

BRIEF DESCRIPTION OF THE DRAWINGS

FIGS. 3A and 3B schematically show an example pattern of a holographic plate provided in the apparatus shown in FIG. 1;

FIGS. 4A, 4B, 4C, 4D, 4E, 4F and 4G schematically show an example method for forming the pattern on the holographic plate shown in FIGS. 3A and 3B, in which FIGS. 4A to 4G show forming steps in time series;

BEST MODE FOR CARRYING OUT THE INVENTION

Preferred embodiments of the present invention will be described with reference to the drawings.

First Embodiment

Figure 1:
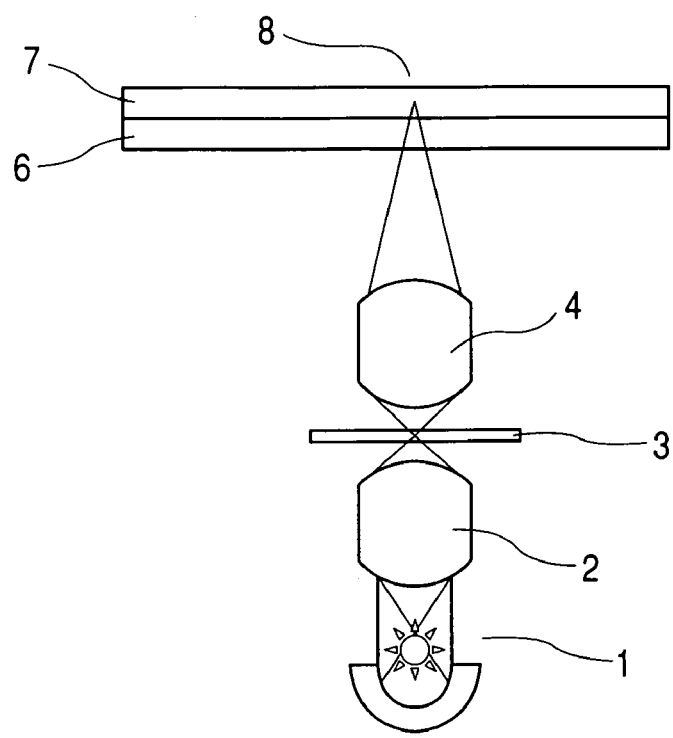
FIG. 1 is a schematic view showing a basic structure of a minute object-handling apparatus according to a first embodiment of the present invention.
Figure 2A:
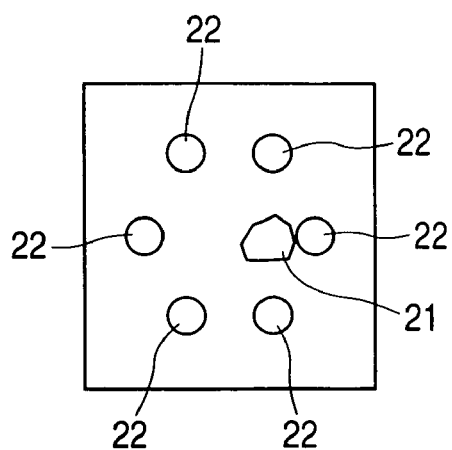
FIGS. 2A and 2B are plan views of the structure in FIG. 1 to show an example of the optical-tweezer pattern.
Figure 2B:
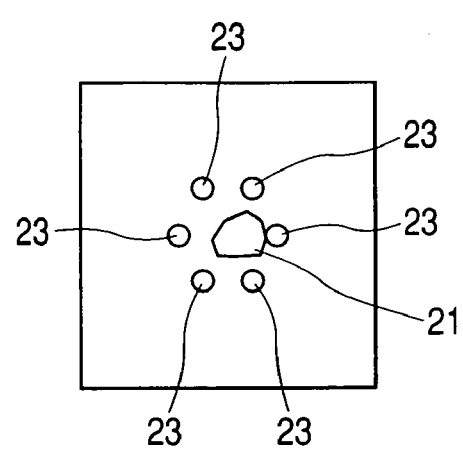

A first embodiment of the present invention will be described with reference to FIGS. 1, 2A and 2B. FIG. 1 is a schematic view showing a basic structure of an apparatus for handling minute objects (hereinafter it may be referred to as "microhandling apparatus") according to this embodiment. FIGS. 2A and 2B are plan views of the structure in FIG. 1 viewed from above, to show an example of optical-tweezers patterns.

The microhandling apparatus has a laser light source 1 for forming an optical tweezers 8 in a sample solution 7 containing a minute object 21 and placed on a transparent plate (second base) 6. For example, a helium-neon laser light source can be used as the laser light source 1. However, the present invention is not limited to this and thus various light sources can be used.

A holographic plate (first base) 3 has a predetermined pattern for transmitting and diffracting the irradiated light to form a desired hologram pattern, and is located between the laser light source 1 and the transparent plate 6. An illumination optical system 2 that irradiates the holographic plate 3 is provided between the laser light source 1 and the holographic plate 3. A projection optical system 4 having a zoom function is provided between the holographic plate 3 and the transparent plate 6 to form an image with the light passing through the holographic plate 3 in the sample solution 7. In addition, an observation optical system (not shown) is provided above the transparent plate 6. The observation optical system may be monocular, or multiocular if necessary.

In the microhandling apparatus, the laser light emitted from the laser light source 1 is imaged in the sample solution 7 through the illumination optical system 2, the holographic plate 3, and the projection optical system 4, thereby forming the optical tweezers 8. Since a holographic plate 3 is used, the optical tweezers 8 is not limited to simple circular pattern but includes patterns differing in shape and patterns made of plural portions, according to the pattern information on the holographic plate.

In this case, basically such an optical tweezers 8 can be formed only by using the holographic plate 3, not requiring plural light sources or complication of the apparatus or enlargement of the apparatus simplified. Thus the apparatus structure is simple. In particular, as is apparent from a usage example described later, when the optical tweezers 8 is made up from plural portions, it is applicable to various uses. The prior arts cannot form such an optical tweezers 8 composed of plural portions without using plural light sources. According to this embodiment using a holographic plate 3, the optical tweezers can be formed using a single light source.

In the example shown in FIG. 2A, an optical-tweezers pattern 22 comprised of circular portions positioned in a hexagonal pattern is formed using the holographic plate 3. As shown in FIG. 2B, when the zoom function of the projection optical system is used, the optical-tweezers pattern 22 can be easily reduced in size to an optical-tweezers pattern 23 where the size and interval of circular portions of the optical tweezers are both reduced.

Next, as a use example of the optical tweezers having a desirable pattern, a method for performing extraction operation using the optical tweezers 8 having a pattern as shown in FIGS. 2A and 2B and a cell sample 7 in which cells are dispersed in a physiological saline is described.

First, the laser light source 1 is activated to form the optical-tweezers pattern 22 in the sample solution 7 as shown in FIG. 2A. At this time, the size of the optical-tweezers pattern 22 is such that the central region surrounded by the circular portions of the pattern is large enough to enclose the minute object 21, a cell, in this case. By that, the minute object 21 is held by the optical-tweezers pattern 22 at a high probability as shown in FIG. 2A.

Whether or not the minute object 21 has been held by the holographic pattern 22 is checked using the above-mentioned observation optical system. The observation optical system may be positioned in advance at a location capable of observing the position at which the pattern 22 is formed for easy checking.

When the observation shows that the object 21 is not held by the pattern 22, the laser light source 1 is turned off to hide the optical tweezers 8 temporarily, and the relative position of the transparent plate 6 to the optical-tweezers forming means including the laser light source 1 and the holographic plate 3 is changed to adjust the location of the optical tweezers to be formed. After that, the optical-tweezers pattern 22 is formed again in the sample solution 7 and whether the object 21 is held is checked again.

After it is ensured that the object 21 is held by the optical-tweezers pattern 22, the pattern of the optical tweezers 8 is reduced in size using the zoom function of the projection optical system 4. Then, as shown in FIG. 2B, the object 21 is driven into the center of the pattern of the optical tweezers 8. Therefore, the object 21 is captured at the center of the reduced optical-tweezers pattern 23. Thus, excellent operability is obtained by providing the optical system for forming the optical tweezers 8 in the sample solution 7 with a function for enlarging and reducing the formed pattern of the optical tweezers 8.

Once the object 21 is captured by the pattern 23, it can be moved relative to the transparent plate 6 by shifting the position of the pattern 23. This also facilitates, for example, DNA extraction from a cell using a device such as a micropipette.

As described above, according to this embodiment using the holographic plate 3, one can form the optical tweezers 8 having the desirable pattern suitable for the sample species and the treatment to be performed, which can enhance operability. For example, DNA extraction from a cell can be repeated in succession to enable quick extraction treatment from many sample cells.

As described above, the holographic plate 3 for forming a hologram having a desirable pattern can be designed using a so-called computer generated hologram (CGH). Processing according to a design can be performed by ordinary lithography for forming a resist pattern on a substrate such as a glass substrate to perform etching processing. The resist pattern can be formed using a general exposure apparatus such as a light exposure apparatus, an electron exposure apparatus, an X-ray exposure apparatus, an EUV exposure apparatus, or an ion beam exposure apparatus. Dry etching processing such as reactive ion etching is preferable in view of good control of the pattern shape. When the resist pattern forming step and the etching step are repeatedly performed, even a complicated pattern can be easily and preferably formed.

FIGS. 3A and 3B show an example of a formed pattern on the above-mentioned holographic plate 3. In this example, a plurality of step-like patterns as shown in FIG. 3B are formed on a quartz substrate 401 as shown in FIG. 3A.

Next, an example of a method for forming the above-mentioned patterns having eight steps by lithography will be described with reference to FIGS. 4A to 4G.

In this example, a quartz substrate 51 is used as a substrate. First, a resist is applied onto the quartz substrate 51, exposed using an I-line stepper, and developed, thereby forming a first resist pattern 52 shown in FIG. 4A. The first resist pattern 52 has a pattern in which five resist strips are arranged. As shown in FIG. 4B, dry etching using $CHF_3$ gas is performed on the quartz substrate 51 using the first resist pattern 52 as a mask. Therefore, four two-step patterns are formed adjacent to one another.

Next, the first resist pattern 52 is removed and then a second resist pattern 53 is similarly formed as shown in FIG. 4C. The second resist pattern 53 covers the first and the third step-like patterns from the left, and a region on the right of the fourth pattern, of the four two-step patterns formed in the preceding step. The quartz substrate 51 is etched using the second resist pattern 53 as a mask. Then, the two-step patterns which are not covered with the resist are etched without changing the patterns. Finally, as shown in FIG. 4D, two four-step patterns are formed each from one etched two-step pattern and one non-etched two-step pattern.

Next, the second resist pattern 53 is removed again and then a third resist pattern 54 is formed as shown in FIG. 4E. The third resist pattern 54 covers, of the two four-step patterns formed in the preceding step, the leftmost pattern in the drawing and a region on the right of the rightmost pattern. Etching is similarly performed using the third resist pattern 54 as a mask. As a result, as shown in FIG. 4F, an eight-step pattern is formed.

Finally, the third resist pattern 54 is removed to complete the eight-step pattern as shown in FIG. 4G.

Second Embodiment

Figure 5:
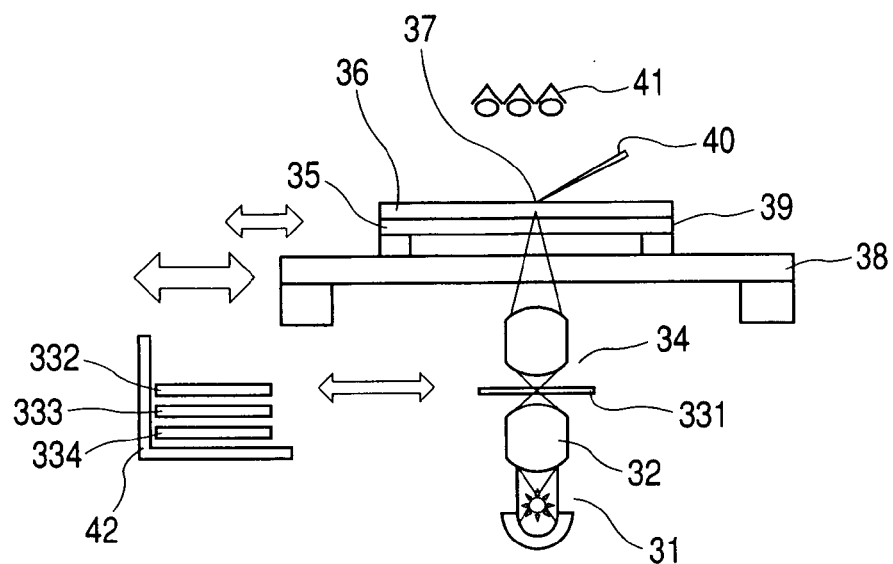
FIG. 5 is a schematic view showing a structure of an entire system of an apparatus for handling a minute object according to a second embodiment of the present invention.

Next, a second embodiment of the present invention will be described with reference to FIG. 5. FIG. 5 schematically shows a structure of an entire system of a microhandling apparatus according to this embodiment.

As in the first embodiment, the microhandling apparatus includes a transparent plate 35 on which a sample solution 36 is placed. The transparent plate 35 is set on a fine motion stage 39 and a coarse motion stage 38. Therefore, a position of the transparent plate 35 can be adjusted in relation to the optical tweezers forming means that forms an optical tweezers 37 and is comprised of, for example, a laser light source 31 such as a helium-neon laser light source and a holographic plate 331. Thus, the position of the optical tweezers 37 can be adjusted.

As described above, the structure having the fine motion stage 39 and the coarse motion stage 38 allows high speed positional adjustment by the coarse motion stage 38 and allows high precision positional adjustment by the fine motion stage 39. Therefore, as a whole, such a structure is preferable in view of its high-speed and high-precision positional adjustment. Thus, when the position of the optical tweezers 37 is adjusted using the fine motion stage 39 and the coarse motion stage 38, it enables rapid and precise positional adjustment between the minute object and the optical tweezers 37 and the movement of the minute object captured by the optical tweezers 37 described in the first embodiment.

A mechanism that adjusts the position of the transparent plate 35 is not limited to this structure. For example, a mechanism that tilts the transparent plate 35 or a mechanism that rotates it may be provided if necessary. In addition, an example in this embodiment shows that the coarse motion stage 38 and the fine motion stage 39 which move the transparent substrate 35 are provided on its side as a mechanism to adjust the position of the optical tweezers 37. Means for moving it may be provided on the optical tweezers forming means side. That is, the transparent plate 35 and the optical tweezers forming means are relatively moved, so that the position of the optical tweezers 37 in the sample solution 36 can be adjusted.

As in the first embodiment, an illumination optical system 32 that irradiates the holographic plate 331 with the laser light and a projection optical system 34 that focuses the light passing through the holographic plate 331 to form a hologram in the sample solution 36 and has a magnification changing function are provided between the laser light source 31 and the transparent substrate 35. Therefore, the optical tweezers 37 having the desirable pattern can be formed according to the pattern information on the holographic plate 331. In addition, the pattern can be enlarged or reduced in size if necessary.

An observation optical system 41 is provided above the transparent plate 35. Therefore, it is possible to monitor a state of manipulation in the sample solution 36 using the optical tweezers 37, for example, a state of capture and transfer of a sample cell or a state of manipulation using a cell treating device 40 such as a micropipette.

Also, the system according to this embodiment further includes a holographic plate library 42, and a plurality of holographic plates 332, 333, and 334 that can form holograms of different patterns stored therein. The holographic plates 331, 332, 333, and 334 can be exchanged as required using plate-changing means (not shown) such as a robot hand and used to form the optical tweezers 37. Thus, according to the structure in this embodiment, the optical tweezers 37 having a pattern suitable for treatment can be selectively used according to the species of the sample 36 and the treatment preformed thereon, so that a system having high versatility can be obtained.

Third Embodiment

Figure 6A:
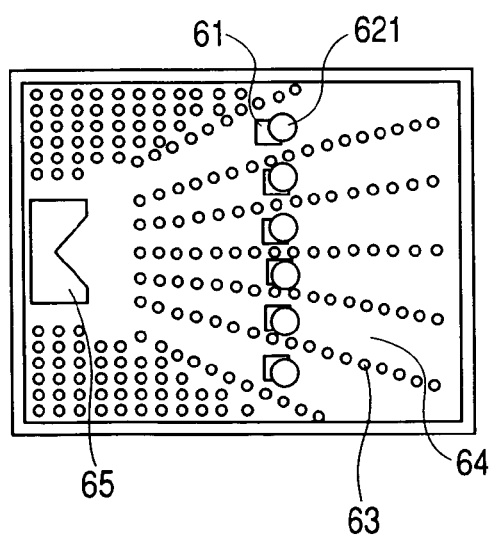
FIGS. 6A and 6B are plan views of a transparent plate in an apparatus for handling a minute object according to a third embodiment of the present invention.
Figure 6B:
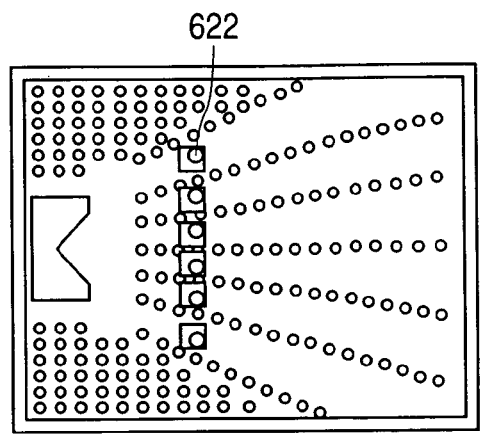

Next, a third embodiment of the present invention will be described with reference to FIGS. 6A and 6B. In this embodiment, a structure of the transparent plate is devised in the structures according to the first and second embodiments. FIGS. 6A and 6B are plan views showing a transparent plate that holds a sample solution.

In this embodiment, the transparent plate has a positioning pattern 65 capable of positioning minute objects 61 to predetermined positions. That is, in the example shown in FIGS. 6A and 6B, the positioning pattern 65 has tapered open spaces whose width is narrowed from the right to the left. Thus, the minute objects 61 are moved from the right to the left, until they are positioned at the innermost position of the open spaces in the positioning pattern 65.

Also, the transparent plate has a guide pattern 63 for forming passages 64 radially extending from the opening of the positioning pattern 65. The guide pattern 63 is constructed such that the minute object 61 is positioned within the passages 64 with high probability at a time when the sample solution containing the minute object 61 is placed on the transparent plate. That is, in the example shown in FIGS. 6A and 6B, the guide pattern 63 is composed of numerous small circular dots. When intervals of the circular dots outside the passages 64 are made smaller than the standard size of the minute object samples 61, for example, a cell sample, it is possible to easily position the minute object 61 within the passages 64.

After the sample solution is placed on the transparent plate, the manipulation for moving the minute object 61 to the positioning pattern 65 is performed using the optical tweezers. In this time, as shown in FIG. 6A, a holographic plate is used to form an optical-tweezers pattern 621 comprised of a circular portion within each passage 64. When an optical tweezers is formed in a region in which the minute object sample 61 is easily positioned due to the guide pattern 63, it is possible to efficiently manipulate the minute object 61 using the optical tweezers.

Then, the optical-tweezers pattern 621 is moved to the left while reducing size to an optical-tweezers pattern 622 as shown in FIG. 6B, from the outside to the inside of the radial passages 64. Thus as described above, the minute object sample 61 positioned within the passages 64 is moved to the positioning pattern 65 with a high probability, to be finally positioned at the predetermined innermost position, e.g., the opening of the positioning pattern 65, with a high probability. When the minute object 61 is positioned and held at the predetermined position, the predetermined treatment such as DNA extraction from the cell can be easily and efficiently performed.

As described above, according to this embodiment, combination use of the transparent plate on which the guide pattern 63 and the positioning pattern 65 are formed for regulating the position of the minute object 61, and a certain optical-tweezers pattern 621 according to the patterns on the transparent plate enables efficient treatment.

The invention claimed is:

1. An apparatus for handling an object by using optical tweezers, comprising:
   a light source;
   a first holographic base to produce a plurality of lights with light emitted from the light source, wherein the plurality of lights is used as the optical tweezers;
   a projection optical system having a zoom function to form an image with the plurality of lights; and
   a second base having a guide pattern fonmed thereon, wherein the second base is configured to hold a liquid including the object, and
   wherein the apparatus is configured such that the object is captured by the plurality of lights and the object moves as the plurality of lights move.

2. The apparatus according to claim 1, wherein the projection optical system is configured to optically enlarge or reduce the optical tweezers to capture the object.

3. The apparatus according to claim 1, wherein a plurality of optical tweezers are formed.

4. The apparatus according to claim 1, wherein the first holographic base is exchangeable.

* * * * *